United States Patent [19]
Goodman

[11] Patent Number: 4,735,056
[45] Date of Patent: Apr. 5, 1988

[54] PRESSURE REGULATING VALVE CONTROLLER

[75] Inventor: Robert B. Goodman, West Hartford, Conn.

[73] Assignee: United Technologies Corporation, Hartford, Conn.

[21] Appl. No.: 880,403

[22] Filed: Jun. 30, 1986

[51] Int. Cl.⁴ .............................................. F28B 9/00
[52] U.S. Cl. ....................................... 62/172; 62/175; 62/DIG. 5; 236/80 A
[58] Field of Search ................ 62/172, 401, 182, 175, 62/228.5, DIG. 5; 236/1 EA, 80 A, 80 B, 80 E

[56] References Cited

U.S. PATENT DOCUMENTS

| | | | |
|---|---|---|---|
| 2,932,176 | 4/1960 | Farkas | 62/DIG. 5 |
| 2,941,373 | 6/1960 | Simmons | 62/DIG. 5 |
| 2,959,028 | 11/1960 | Beggs | 62/DIG. 5 |
| 2,961,939 | 11/1960 | Typaldos | 62/DIG. 5 |
| 3,045,983 | 7/1962 | Best | 62/172 X |
| 3,537,644 | 11/1970 | Davison | 236/80 A |
| 4,318,509 | 3/1982 | Patrick et al. | 236/80 A |

Primary Examiner—Harry B. Tanner
Attorney, Agent, or Firm—John Swiatocha

[57] ABSTRACT

A pressure regulating valve controller for controlling the flow of refrigerant airflow through one of a plurality of air cycle systems is described. The controller includes pressure regulating means (145) for controlling flow in response to changes in ram air temperature as well as pressure regulating means (140 and 315) in response to the number of operating air cycle systems.

8 Claims, 2 Drawing Sheets

PRESSURE REGULATING VALVE CONTROLLER

DESCRIPTION

1. Technical Field

This invention relates in general to valve controllers and specifically to a controller for a pressure regulating valve in an aircraft cabin air conditioning system.

2. Background Art

Air cycle air conditioning systems, which employ gas turbine engine compressor bleed air as a refrigerant, are widely employed to cool and pressurize cabins of commercial and military aircraft. In multiengined aircraft, it is a common practice to employ multiple air cycle refrigeration systems, each charged with compressor bleed air from a single engine. For operational efficiency of the gas turbine engines, it is desirable to bleed only as much air as is necessary for cabin cooling and pressurization. Excessive compressor bleed airflow to the air cycle systems increases engine operating costs significantly.

While various systems for controlling compressor bleed airflow to an air cycle system in response to such parameters as altitude and cabin temperature have been proposed, for the most part, such control systems have exhibited less than optimum flow control.

3. Disclosure of Invention

Accordingly, it is among the principal objects of the present invention to provide an improved controller for regulating compressor bleed airflow from a gas turbine engine or engines to multiple air cycle refrigeration systems in an aircraft cabin air cycle, air conditioning system.

In accordance with the present invention, a pressure regulating valve which sets compressor bleed airflow from a gas turbine engine to an air cycle refrigeration system is controlled by a controller which is responsive to the temperature of ram air entering the aircraft and which includes means for increasing the opening of the pressure regulating valve when a second air cycle refrigeration system is deactivated to increase the flow and, therefore, cooling and pressurizing capacity of the operational refrigeration system. The controller also includes means to override such increased valve opening should it be desired to maintain relatively low flow through the operational refrigeration system during periods of low cooling demand such as, for example, under conditions of minimal aircraft cabin occupancy.

In the preferred embodiment of the present invention, the pressure regulating valve is operated by a pneumatic actuator, pneumatic servo pressure provided thereto and, therefore, the operation thereof being controlled by a pressure regulator comprising a vent aperture in a main servo conduit which pressurizes the actuator. The effective area of the vent aperture and therefore, flow therethrough, are set by a movable closure responsive to ram air temperature. The main servo conduit also communicates with a second pressure regulator which provides a step function adjustment in pneumatic pressure within the main servo conduit under conditions of deactivation of a second air cycle refrigeration system, thereby providing a step function adjustment in servo pressure to the valve actuator to achieve the aformentioned increased opening of the pressure regulating valve to compensate for the deactivation of the other air cycle refrigeration system. An opposite step function adjustment in pneumatic pressure within the main servo conduit is effected by another controllable vent which overrides the second pressure regulator to effect a partial closing of the pressure regulating valve, from a fully opened condition thereof despite deactivation of the other air cycle refrigeration system.

BEST MODE FOR CARRYING OUT THE INVENTION AND INDUSTRIAL APPLICABILITY THEREOF

Figure 1:
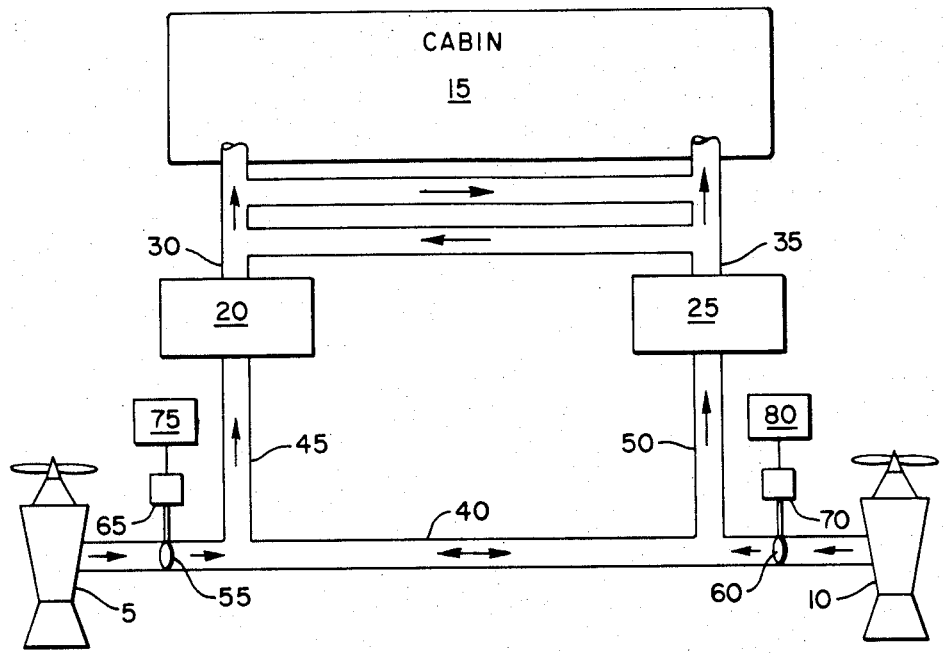
FIG. 1 is a simplified schematic of an aircraft cabin air conditioning system employing a pair of air cycle refrigeration systems.

Referring to FIG. 1, an aircraft (not shown) powered by a pair of gas turbine engines 5 and 10 includes a cabin 15 pressurized and cooled by a pair of air cycle refrigeration systems 20 and 25 discharging chilled air through outlet conduits 30 and 35, in a manner well known in the art. Each air cycle refrigeration system is charged with compressor discharge air from engines 5 and 10 through bleed air lines 40, 45 and 50. As those skilled in the art will readily appreciate, operation of the aircraft under conditions of high cooling demand such as in a warm environment and/or under high cabin occupancy conditions, requires near maximum output from the air cycle systems. Conversely, operation under conditions of low cooling demand such as in a cooler environment and/or under minimal cabin occupancy conditions, will require significantly less cooling output from the air cycle systems and may even justify deactivation of one of the systems to conserve engine compressor discharge airflow. Accordingly, line 40 is provided with pressure regulating valves 55 and 60 to control the amount of bleed air with which the air cycle systems are charged. Valves 55 and 60 are operated by actuators 65 and 70 which are controlled by controllers 75 and 80.

Figure 2:
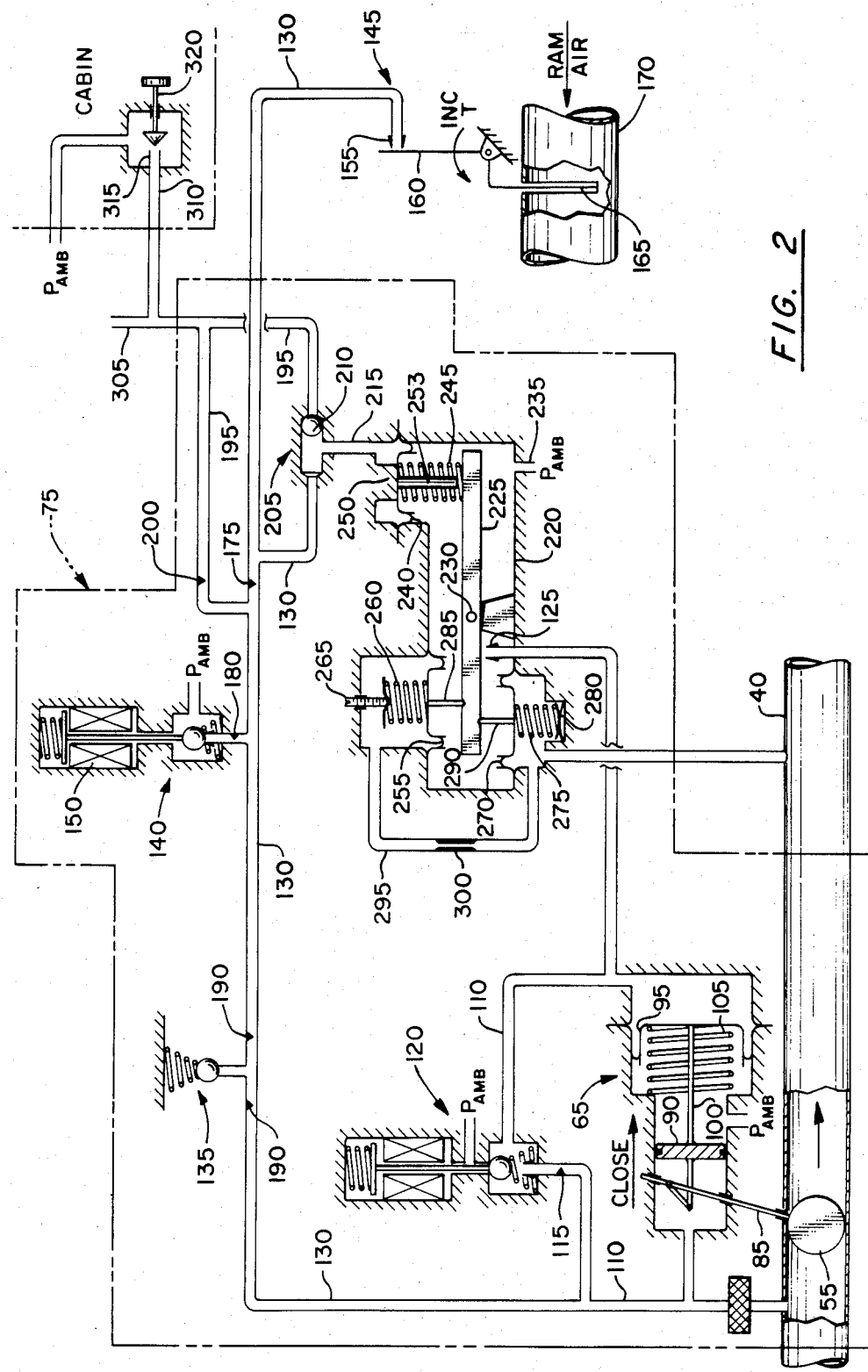
FIG. 2 is a schematic of the pressure regulating valve controller of the present invention.

Controller 75 is shown in detail in FIG. 2. As set forth hereinabove, pressure regulating valve 55 is operated by valve actuator 65 connected to the valve by a linkage 85. Actuator 65 includes a piston 90 connected to diaphragm 95 by rod 100, the diaphragm being biased to the right by spring 105 and the volume between the diaphragm and the piston being vented to ambient. As will be readily appreciated, when the fluid pressure force on piston 90 overcomes the forces on diaphragm 95 from pressure thereon and from spring 105, the piston and diaphragm will move to the right closing valve 55. Likewise, when the forces on diaphragm 95 overcome the fluid pressure forces on piston 90, the piston and diaphragm will move to the left, opening the valve.

Actuator 65 is pressurized at both ends thereof with air through main servo conduit 110 with which the actuator communicates at opposite ends thereof. Conduit 110 is provided with a flow restrictor 115 and a solenoid actuated valve 120 which communicates with ambient, whereby actuation of the solenoid opens the valve whereupon the right side of actuator 65 is immediately vented to ambient for complete closure of valve 55. Main servo conduit 110 is also provided with vent 125 aperture therein.

Main servo conduit 110 also communicates with a first branch line 130 provided with pressure regulator 135, and variable orifices 140 and 145 therein. As illustrated, pressure regulator 135 comprises a simple spring biased ball valve, while variable orifice 140 comprises a similar ball valve electrically actuated by solenoid 150. Variable orifice 145 comprises a vent aperture 155 in the end of branch line 130. The effective opening of this vent aperture 155 is modulated by a movable closure 160 connected to bimetallic element 165 which responds by differential thermal expansion thereof to the temperature of ram air entering the aircraft through conduit 170. Branch line 130 also includes flow restrictors 175, 180 and 190 therewithin for controlling the dynamic response of pneumatic pressure within the branch line to actuation of the various pressure regulators therein.

A second branch line 195 having flow restrictor 200 therewithin, communicates with first branch line 130 immediately downstream of flow restrictor 175.

First and second branch lines 130 and 195 terminate at selector valve 205 having a reciprocatable ball element 210 therewithin. As those in the art will appreciate, ball element 210 responds to the highest pressure applied thereto at an inlet to the valve by closing an opposite inlet, thereby always passing the highest pressure from either branch line 130 or branch line 195 to outlet 215.

Outlet 215 communicates with chamber 220 having closure member 225 pivotally mounted therein at 230. Chamber 220 is vented to ambient at 235 and also houses, at the right end thereof, movable diaphragm 240 biased upwardly by spring 245, stop 250 and plunger 253, movable with the diaphragm. The left-hand end of chamber 220 houses diaphragm 255 biased downwardly by spring 260, the preload thereof being adjustable by means of adjustment screw 256. The lower portion of the lefthand end of chamber 220 houses diaphragm 270 biased upwardly by spring 275, the preload of which is adjusted in response to temperature by temperature compensating mount 280 in a manner well known in the art. Diaphragms 255 and 270 are connected to the left-hand end of movable closure 225 by links 285 and 290. The upper and lower portions of chamber 220 are connected by line 295 having dynamic compensating flow restrictor 300 therewithin.

Second branch line 195 includes an extension 305 which communicates with another selector valve (not shown) similar to selector valve 205, but associated with the controller for valve actuator 70 which drives the other pressure regulating valve 60. A second extension 310, from branch line 195, is provided with vent aperture 315 at the end thereof, flow through this vent aperture to ambient being controlled by plunger 320 for purposes of overriding pressure regulator 140, in a manner to described hereinafter in further detail.

Controller 75 of the present invention operates as follows. Under normal conditions, with both air cycle systems operating, regulated pressure in line 40 downstream of valve 55 is set by pressure regulating valve 55, operated by actuator 65, which is controlled by the response of controller 75 to ram air temperature in conduit 170. Bimetallic element 165 flexes in response to changing ram air temperature, thereby moving closure member 160 which adjusts the effective opening of vent aperture 155. Counterclockwise movement of closure 160 in response to increased ram air temperature increases the effective opening of vent aperture 155, thereby lowering the pressure in first branch line 130. Likewise, clockwise movement of closure 160 in response to decreased ram air temperature effects a closing of vent aperture 155, thereby increasing the pressure within branch line 130. This change in pressure within branch line 130 is transmitted to both selector valve 205 and diaphragm 240 within chamber 220. Assuming the position of ball element 210 in selector valve 205 is as illustrated, an increase in ram air temperature from steady state conditions will effect a further opening of vent aperture 155, thereby lowering the pressure within branch line 130 on diaphragm 240 and relieving the downward fluid pressure force on the right-hand end of closure 225. This causes the net sum of the steady state forces on the closure to pivot the closure in a counterclockwise direction, thereby decreasing the effective opening of vent aperture 125 in main servo conduit 110. This increases the servo pressure within conduit 110, thereby increasing the force on actuator diaphragm 95 whereby the piston and diaphragm move to the left, opening regulator valve 55 to increase the airflow through line 40 to air cycle refrigeration system 20.

Similarly, again assuming the position of ball element 210 in selector valve 205 is as illustrated, a decrease in ram air temperature causes closure 160 to reduce the effective opening of vent aperture 155, thereby raising the pressure within branch line 130 on diaphragm 240. This increases the downward force on the right end of closure 225 from steady state conditions, thereby causing a clockwise rotation of closure 225 to increase the opening of vent aperture 125 thereby lowering the pressure within main servo conduit 110. This decreased pressure is applied to diaphragm 95 whereby the pressure on piston 90 overcomes that on the diaphragm, causing movement of the piston and diaphragm to the right, thereby closing regulator valve 55 to decrease the flow of air to air cycle machine 20 through line 40.

Figure 3:
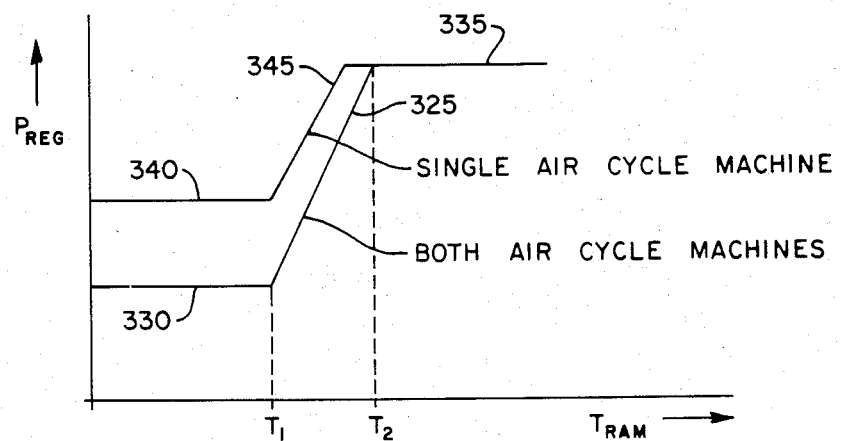
FIG. 3 is a graphical representation of the regulated pressure through one of the air cycle refrigeration systems during the various modes of operation of the controller illustrated in FIG. 2.

Referring to FIG. 3, the control response of regulated pressure in conduit 40 to ram air temperature for simultaneous operation of both air cycle systems is illustrated by line segment 325, increasing ram air temperature causing an increase in regulated pressure and decreasing ram air temperature causing a decrease in regulated pressure in conduit 40. Pressure regulator 135 maintains a constant pressure within branch line 130 when vent aperture 155 is fully closed for temperature ranges less than T, whereby the setting of the pressure regulating valve 55 remains constant. As indicated by line segment 335 in FIG. 3, at elevated ram temperatures (greater than $T_2$) when closure 160 opens vent aperture 155 to a maximum area, stop 250 limits the upward movement of diaphragm 240 whereby further increases in ram air temperature have no effect on the force on closure 225, servo pressure within main servo conduit 110 and actuator 65, and therefore the setting of regulator valve 55. As ram temperature decreases and aperture 155 closes, pressure in conduit 130 increases, causing force on diaphragm 240 to overcome the force from spring 245. The free end of plunger 253 will then move and contact closure 225, applying a force thereto, proportional to the pressure in conduit 130 for adjustment of pressure regulating valve in the manner described hereinabove. Pressure regulator 135 maintains a constant pressure within branch line 130 when vent aperture 155 is fully closed.

In the event that it is desired to deactivate air cycle system 25 due to, for example, a malfunction thereof or a low cooling demand, solenoid 150 is activated, thereby opening ball valve 140 to vent pressure in branch line 130 through orifice 180 to ambient. This valve opening effects a step function decrease in nominal steady state pressure within branch line 130 and, therefore, a steady state increase on the force on closure 225 which in turn effects a corresponding nominal steady state increase in pressure within main servo conduit 110. This step function change in nominal pressure within servo conduit 110, effects a nominal, more fully opened setting of valve 55. This has the effect of increasing the minimum regulated pressure associated with flow through the single operating air cycle machine as indicated by line segment 340 in FIG. 3. As indicated by line segment 345, changes in ram air temperature under such conditions will effect a corresponding change in the setting of valve 55 and, therefore, regulated pressure within line 40 in the manner described hereinabove with respect to simultaneous operation of both air cycle machines.

In the event that it is desired to override pressure regulator 140 such as, for example, operation of a single air cycle systems under conditions of extremely low cooling demand (i.e., an empty cabin), plunger 320 is actuated to close vent aperture 315, thereby raising the pneumatic pressure within second branch line 195. This increase in pressure causes ball 210 of selector valve 205 to shuttle to the left, closing off first branch line 130, whereby the now increased pressure within second branch line 195 is applied to diaphragm 240, resulting in opening of vent aperture 125 by closure 225 in a manner similar to that described hereinabove. This lowers the pressure within main servo conduit 110 and on diaphragm 95, thereby partially closing valve 55 to lower the flow through the single operating air cycle machine in response to the low cooling demand.

From the foregoing, it will be apparent to one skilled in the art, that the controller of the present invention efficiently controls the flow of compressor bleed air to a plurality of air cycle refrigeration systems employed in an aircraft's air conditioning system in response to variations in both ram air temperature and cabin cooling demand. The controller provides quick and effective changeover from operation with a single air cycle system to operation with multiple air cycle systems. However, efficient regulation of compressor bleed air is not accompanied by a lack of controller flexibility, since the minimum regulated pressure associated with a single operating air cycle system may be readily adjusted to compensate for variations in cooling demand.

While the present invention has been illustrated and described with respect to a particular preferred embodiment thereof, it will be appreciated by those skilled in the art that various modifications to the system may be made without departing from the present invention. For example, while the controller of the present invention has been shown and described with respect to a twin engine airplane employing two air cycle refrigeration systems, it will be understood that the invention may be employed with greater numbers of such systems. Similarly, while various configurations of valves and flow control devices are illustrated, various equivalent devices may be employed without departing from the invention herein. Thus, it will be understood that the following claims cover the embodiment described herein and all such equivalents thereof as fall within the true spirit and scope of this invention.

Having thus described the invention, what is claimed is:

1. In an aircraft cabin air conditioning system comprising a pair of air cycle refrigeration systems which provide chilled air to said cabin, airflow through said air cycle refrigeration systems being controllable by a pair of pressure regulating valves, each of said pressure regulating valves being disposed in a corresponding main airflow conduit and operated by a corresponding pneumatic valve actuator, the improvement characterized by:
one of said pneumatic valve actuators associated with one of said pressure regulating valves being operated by a controller comprising:
a main servo conduit communicating with one of said main airflow conduits and said pneumatic valve actuator for channeling pneumatic pressure thereto from said main airflow;
a first pressure regulator communicating with said main servo conduit for continuously adjusting pneumatic pressure therewithin in response to ram air temperature, thereby controlling said valve actuator in response to ram air temperature;
a second pressure regulator communicating with said main servo conduit for providing step function adjustment in pneumatic pressure therewithin in response to an input signal associated with deactivation of the air cycle system associated with the other valve actuator to effect a corresponding opening of said one pressure regulating valve by said one valve actuator; and
means communicating with said main servo conduit for overriding said second pressure regulator to effect partial closing of said one pressure regulating valve despite the deactivation of said air cycle system.

2. The aircraft cabin air conditioning system of claim 1 characterized by:
a first branch line communicating with said main servo conduit; and
said first pressure regulator comprising a first vent aperture disposed in said first branch line, the effective opening of said first vent aperture being modulated by a first movable closure responsive in position to ram air temperature.

3. The aircraft cabin air conditioning system of claim 2 characterized by said second pressure regulator comprising a remotely actuatable relief valve connected to said first branch line.

4. The aircraft cabin air conditioning system of claim 1 characterized by:
a first branch line communicating with said main servo conduit;
said second pressure regulator being disposed within said first branch line to control the pneumatic pressure therewithin; and
a second vent aperture disposed in said main servo conduit for adjusting the pressure therewithin, the effective opening of said second vent aperture being modulated by a second movable closure member responsive in position to the pneumatic pressure within said first branch line;
said means for overriding said second pressure regulator comprising means for selectively nullifying the response of said second closure to the pneumatic pressure within said first branch line.

5. The aircraft cabin air conditioning system of claim 4 characterized by:

a second branch line communicating with said first branch line for pressurization therefrom, said means for selectively nullifying the response of said second movable closure to the pneumatic pressure within said first branch line, comprising means for rendering said second movable closure responsive to pneumatic pressure with said second branch line.

6. The aircraft cabin air conditioning system of claim 5 characterized by:

a control actuator operatively connected to said second closure for positioning said second closure in response to pneumatic pressure applied to said control actuator;

said nullifying means comprising a selector valve communicating at a pair of inlets thereof with said first and second branch lines and at an outlet thereof, with said control actuator;

said selector valve automatically applying the highest of said pneumatic pressures in said first and second branch lines to said second pneumatic actuator in response to an input signal to said selector valve.

7. The aircraft cabin air conditioning system of claim 5 characterized by:

a third vent aperture disposed in said second branch line; and means for selectively closing said third vent aperture to provide a step function increase in the pneumatic pressure within said second branch line to actuate said selector valve for the application of said pneumatic pressure in said second branch line to said control actuator.

8. The aircraft air conditioning system of claim 2 characterized by:

a third pressure regulator disposed in said first branch line for limiting the pressure within said first branch line, thereby limiting the closure of said pressure regulating valve when said first vent aperture is effectively closed by said first movable closure.

* * * * *